United States Patent
Hinz et al.

(10) Patent No.: US 9,515,545 B2
(45) Date of Patent: Dec. 6, 2016

(54) POWER CONVERSION WITH EXTERNAL PARAMETER DETECTION

(71) Applicant: Infineon Technologies Austria AG, Villach (AT)

(72) Inventors: Torsten Hinz, Augsburg (DE); Marc Fahlenkamp, Geretsried (DE); Martin Krueger, Oberschleissheim (DE)

(73) Assignee: Infineon Technologies Austria AG, Villach (AT)

( * ) Notice: Subject to any disclaimer, the term of this patent is extended or adjusted under 35 U.S.C. 154(b) by 65 days.

(21) Appl. No.: 14/598,747

(22) Filed: Jan. 16, 2015

(65) Prior Publication Data
US 2015/0236597 A1 Aug. 20, 2015

Related U.S. Application Data

(60) Provisional application No. 61/940,119, filed on Feb. 14, 2014.

(51) Int. Cl.
| | |
|---|---|
| *H02M 3/156* | (2006.01) |
| *H02M 1/08* | (2006.01) |
| H02M 3/157 | (2006.01) |
| H02M 3/335 | (2006.01) |
| H02M 1/00 | (2006.01) |

(52) U.S. Cl.
CPC ............. *H02M 1/08* (2013.01); *H02M 3/156* (2013.01); *H02M 3/33523* (2013.01); *H02M 3/157* (2013.01); *H02M 3/33515* (2013.01); *H02M 2001/0022* (2013.01); *H02M 2001/0058* (2013.01); *H02M 2001/0064* (2013.01); *Y02B 70/1491* (2013.01)

(58) Field of Classification Search
CPC   H02M 3/33523; H02M 3/28; H02M 3/33569; H02M 3/3385; H02M 3/33507; H02M 1/083; H02M 3/33515; H02M 3/33546; H02M 3/33553
USPC ................... 363/16, 20, 21.08, 21.16, 21.12, 21.13,363/21.18
See application file for complete search history.

(56) References Cited

U.S. PATENT DOCUMENTS

| | | | |
|---|---|---|---|
| 6,958,920 B2 | 10/2005 | Mednik et al. | |
| 8,222,882 B2 * | 7/2012 | Balakrishnan | .... H02M 3/33507 323/283 |
| 8,599,581 B2 * | 12/2013 | Huang | .............. H02M 3/33523 363/21.12 |

(Continued)

FOREIGN PATENT DOCUMENTS

GB        2490542 A     11/2012

*Primary Examiner* — Gary L Laxton
*Assistant Examiner* — Kyle J Moody
(74) *Attorney, Agent, or Firm* — Slater Matsil, LLP

(57) ABSTRACT

In accordance with an embodiment, a method includes driving an electronic switch in a switched-mode power converter in successive drive cycles, wherein driving the switch in each of the drive cycles comprises switching on the electronic for an on-period and subsequently switching off the electronic switch for an off-period, and measuring an operation parameter of the switched-mode power converter during the on-periods of the drive cycles, and storing the operation parameter measured in an on-period if a duration of the on-period met a predefined criteria. The method further includes forcing the on-period of a drive cycle to meet the predefined criteria if the operation parameter has not been stored for a predefined number of drive cycles, or for a pre-defined time duration.

26 Claims, 10 Drawing Sheets

(56) References Cited

U.S. PATENT DOCUMENTS

| | | | |
|---|---|---|---|
| 8,787,039 B2* | 7/2014 | Shi | H02M 1/4258 |
| | | | 363/16 |
| 9,236,793 B2* | 1/2016 | Huang | H02M 1/4258 |
| 2008/0278973 A1 | 11/2008 | Lin et al. | |
| 2008/0309380 A1 | 12/2008 | Yang et al. | |
| 2010/0054000 A1 | 3/2010 | Huynh | |
| 2014/0307484 A1* | 10/2014 | Yang | H02M 3/33569 |
| | | | 363/21.12 |
| 2015/0062981 A1* | 3/2015 | Fang | H02M 3/33507 |
| | | | 363/21.17 |
| 2015/0244275 A1* | 8/2015 | Hinz | H02M 3/33507 |
| | | | 363/21.17 |

* cited by examiner

POWER CONVERSION WITH EXTERNAL PARAMETER DETECTION

This application claims the benefit of U.S. Provisional Application No. 61/940,119, filed on Feb. 14, 2014, which application is hereby incorporated herein by reference.

TECHNICAL FIELD

This disclosure in general relates to power conversion.

SUMMARY

One embodiment relates to a method. The method includes driving an electronic switch in a switched-mode power converter in successive drive cycles, wherein driving the switch in each of the drive cycles comprises switching on the electronic for an on-period and subsequently switching off the electronic switch for an off-period, and measuring an operation parameter of the switched-mode power converter during the on-periods of the drive cycles, and storing the operation parameter measured in an on-period if a duration of the on-period met a predefined criteria. The method further includes forcing the on-period of a drive cycle to meet the predefined criteria if the operation parameter has not been stored for a predefined number of drive cycles, or for a pre-defined time duration.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

DETAILED DESCRIPTION OF ILLUSTRATIVE EMBODIMENTS

Figure 1:
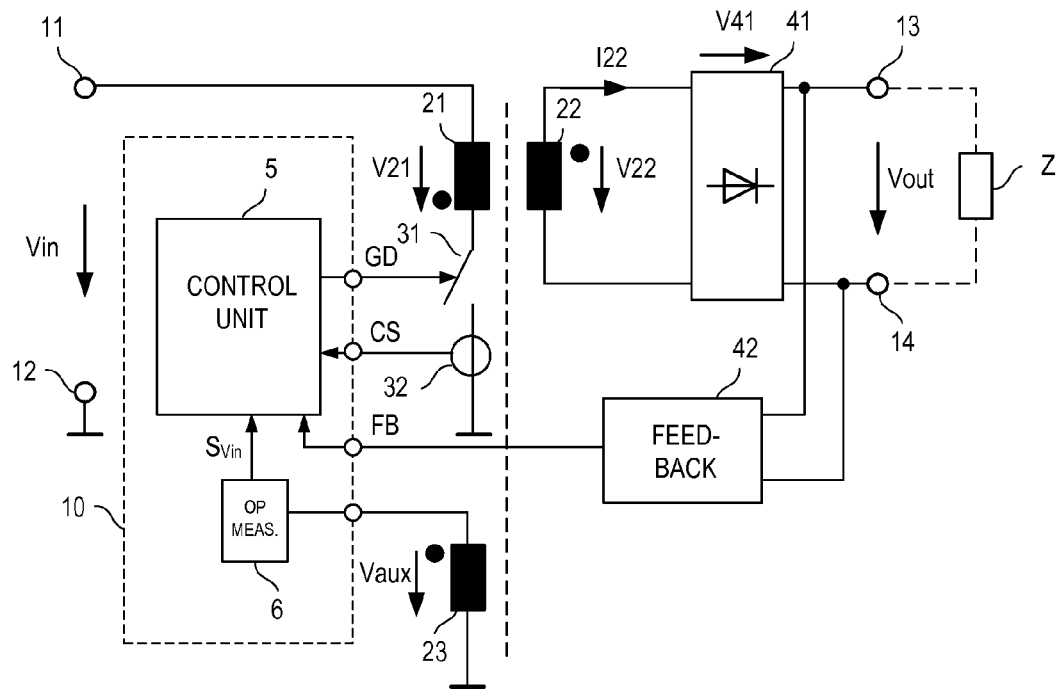
FIG. 1 illustrates one embodiment of a switched-mode power converter.

FIG. 1 shows one embodiment of a switched-mode power converter. The switched-mode power converter shown in FIG. 1 includes an input with a first input node 11 and a second input node 12 for receiving an input voltage Vin and an input current Iin, and an output with a first output node 13 and a second output node 14 for supplying an output voltage Vout and an output current Iout to a load Z (illustrated in dashed lines in FIG. 1) that may be connected to the output 13, 14. According to one embodiment, the switched-mode power converter is configured to generate the output voltage Vout from the input voltage Vin such that the output voltage Vout has a substantially constant voltage level which is widely independent of a power consumption of the load Z. The switched-mode power converter is configured to regulate the output voltage Vout by suitably driving an electronic switch 31 that is connected in series with a primary winding 21 of a transformer. The series circuit with the primary winding 21 and the electronic switch 31 is coupled to the input 11, 12 of the switched-mode power converter.

The transformer further includes a secondary winding 22 which is inductively coupled with the primary winding 21, and a rectifier circuit 41 connected between the secondary winding 22 and the output 13, 14. The switched-mode power converter shown in FIG. 1 has a flyback converter topology. That is, the primary winding 21 and the secondary winding 22 of the transformer have opposite winding senses.

Referring to FIG. 1, the switched-mode power converter includes a controller (which may also be referred to as drive circuit) which is configured to drive the electronic switch 31. Specifically, the controller 10 generates a drive signal GD which is received at a control node of the electronic switch 31 and switches the electronic switch 31 on or off. The controller may be configured to drive the electronic switch 31 in a PWM (Pulse-Width Modulated) fashion. In this case, the drive signal is a PWM signal.

The controller 10 includes a control unit 5 that is configured to drive the electronic switch 31 based on the output voltage Vout of the switched-mode power converter. For this, the controller 10 receives a feedback signal FB which is based on the output voltage Vout from a feedback circuit 42. Further, the controller 10 is configured to drive the electronic switch 31 based on an operation parameter of the switched-mode power converter. According to one embodiment, the operation parameter is the input voltage Vin. The input voltage Vin may be measured based on a voltage Vaux across an auxiliary winding 23 of a transformer. The auxiliary winding 23 is inductively coupled with the primary winding 21 and the secondary winding 22. According to one embodiment, the auxiliary winding 23 and the secondary winding 22 have same winding senses.

According to one embodiment, the controller 10 includes a measurement circuit 6 connected to the auxiliary winding 23 and configured to generate an operation parameter signal $S_{Vin}$ based on the auxiliary voltage Vaux. A control unit 5 of the controller 10 receives the operation parameter signal and is configured to drive the electronic switch 31 based on the operation parameter signal $S_{Vin}$. The operation parameter signal represents the operation parameter, e.g., the input voltage Vin. This is explained in greater detail herein below.

According to one embodiment, the controller 10 is configured to drive the electronic switch 31 based on the input current Iin. In this case, a current sensor 32 measures the input current Iin and supplies a current sensing signal CS which represents the input current Iin to the controller 10. The current sensor 32 may be implemented as a shunt resistor (not shown in FIG. 1) connected in series with the electronic switch 31. In this case, a voltage across the shunt resistor may be used as the current sensing signal CS.

Figure 2:
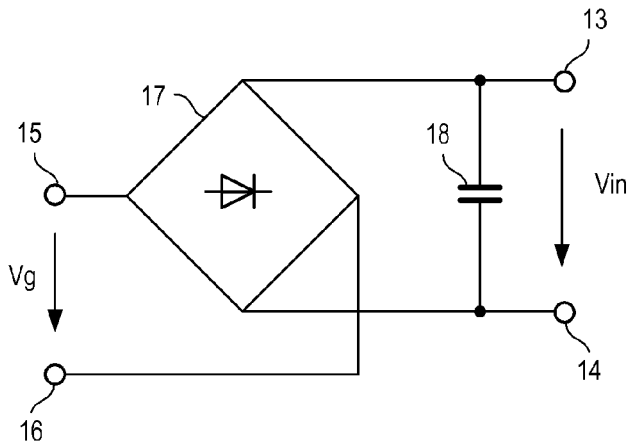
FIG. 2 illustrates one embodiment of generating an input voltage of the switched-mode power converter.

According to one embodiment, the input voltage Vin, like the output voltage Vout, is substantially a direct voltage. Referring to FIG. 2, the substantially direct input voltage Vin may be generated from an alternating grid voltage Vg using a bridge rectifier 17 and a capacitor 18, wherein the capacitor 18 is connected between the input nodes 11, 12 of the switched-mode power converter. In this embodiment, the switched-mode power converter shown in FIG. 1 can be used to generate a direct output voltage Vout from a grid voltage Vg.

Figure 3:
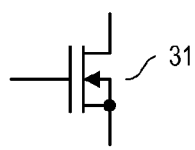
FIG. 3 illustrates one embodiment of an electronic switch of the switched-mode power converter.

The electronic switch 31 can be a conventional electronic switch. According to one embodiment shown in FIG. 3, the electronic switch 31 is a MOSFET (Metal-Oxide Field-Effect Transistor). This MOSFET includes a load path between a drain node and a source node, and a gate node as a control node. When a MOSFET as shown in FIG. 3 is used as the electronic switch 31 in the switched-mode power converter shown in FIG. 1, the gate node receives the drive signal GD and the load path (drain-source path) is connected in series with the primary winding 21 of the transformer. However, the electronic switch 31 is not restricted to be implemented as a MOSFET. Another type of transistor, such as an IGBT (Insulated Gate Bipolar Transistor), a BJT (Bipolar Junction Transistor), a JFET (Junction Field-Effect Transistor) or even combinations of several transistors, such as a cascade circuit with a JFET and a MOSFET, may be used as well.

Figure 4:
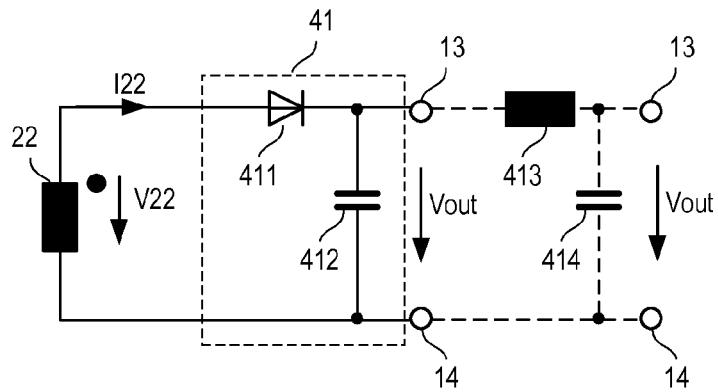
FIG. 4 illustrates one embodiment of a rectifier circuit of the switched-mode power converter.

The rectifier circuit 41 can be implemented with a conventional rectifier circuit topology. One embodiment of such rectifier circuit 41 is illustrated in FIG. 4. The rectifier circuit 41 according to this embodiment includes a series circuit with a rectifier element 411 and a capacitor 412, wherein the series circuit is connected in parallel with the secondary winding 22 of the transformer, and wherein the output voltage Vout is available across the capacitor 412. The rectifier element 411 is drawn as a diode in FIG. 4. However, another type of rectifier element such as a MOSFET operated as a synchronous rectifier (SR) may be used instead.

According to another embodiment, the rectifier circuit 41 has a topology which is more complex than the topology explained before. According to one embodiment, which is illustrated in dashed lines in FIG. 4, a series circuit with an inductor 413 and a further capacitor 414 is connected in parallel with the capacitor 412 explained hereinbefore. In this case, the output voltage Vout is available across the further capacitor 414.

Figure 5:
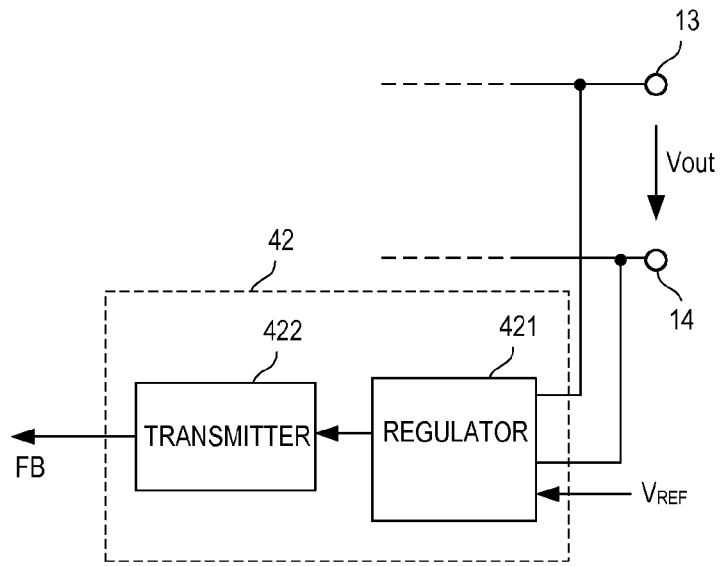
FIG. 5 illustrates one embodiment of a feedback circuit of the switched-mode power converter.

FIG. 5 shows one embodiment of the feedback circuit 42. Referring to FIG. 5, the feedback circuit 42 includes a regulator 421 that receives the output voltage Vout and that either receives a reference voltage $V_{REF}$ (as shown) or internally generates the reference voltage. The regulator 421 compares the output voltage Vout with the reference voltage $V_{REF}$ and generates the feedback signal FB based on this comparison. The regulator 421 may have one of a proportional (P) characteristic, a proportional-integral (PI) characteristic, or the like. According to one embodiment, the regulator 421 is implemented on the secondary side of the switched-mode power converter and the feedback circuit 42 includes a transmitter 422 that is configured to transmit the feedback signal FB from the secondary side of the switched-mode power converter to the primary side across the potential barrier (isolation barrier) provided by the transformer. The controller 10 is implemented on the primary side in this embodiment. The transmitter circuit 422 may include an optocoupler, or any other type of circuitry that is suitable to transmit a signal across a potential barrier. According to another embodiment, the transmitter 422 includes another transformer.

Figure 6:
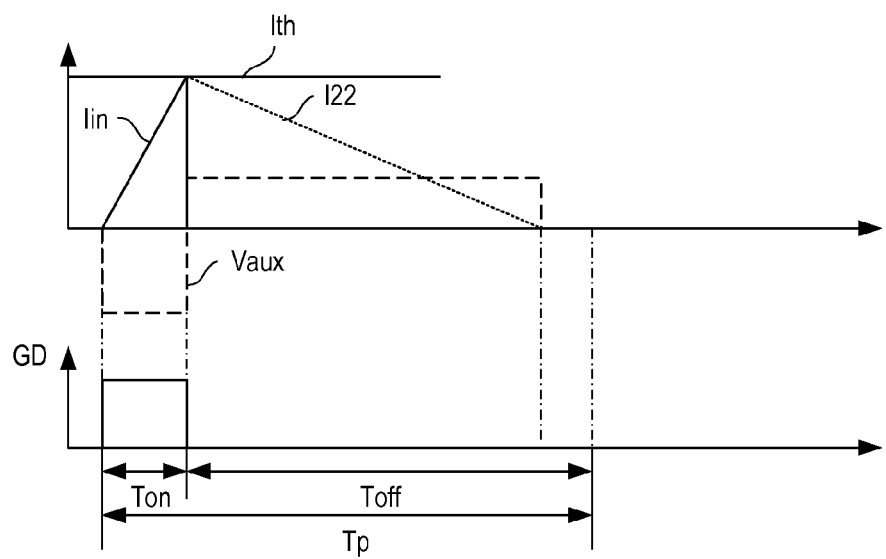
FIG. 6 shows timing diagrams that illustrate one way of operation of the switched-mode power converter.

One way of operation of the switched-mode power converter is explained with reference to FIG. 6. FIG. 6 shows, during one drive cycle of the switched-mode power converter, timing diagrams of the drive signal GD, the input current Iin, a secondary side current I22, and the auxiliary voltage Vaux. Referring to FIG. 1, the secondary side current I22 is the current through the secondary winding 22. Referring to FIG. 6, the primary side current Iin reaches a peak value at the end of the on-period and the secondary side current I22 reaches a peak value at the beginning of the off-period Toff. Just for the purpose of illustration, the primary side current Iin and the secondary side current I2 are drawn to have the same peak value. Actually, these peak values are proportional, wherein $I22_p = N23/N22 \cdot Iin_p$. $I22_p$ denotes the peak value of the secondary side current, $Iin_p$ denotes the peak value of the primary side current, and N21/N22 denotes the winding ratio between the number N21 of windings of the primary winding 21 and the number N22 of windings of the secondary winding. Thus, the illustration in FIG. 6 either represents the special case in which N21=N22 or shows the secondary side current I22 as being normalized to the peak value of the primary side current Ip.

The controller 10 is configured to drive the electronic switch 31 in successive drive cycles. Referring to FIG. 6, each drive cycle includes an on-period in which the drive signal GD has an on-level that switches on the electronic switch, and a subsequent off-period in which the drive signal GD has an off-level that switches off the electronic switch. For the purpose of illustration, it is assumed that the on-level corresponds to high signal level and the off-level corresponds to a low signal level. An overall duration Tp of one drive cycle is given by a duration Ton of the on-period plus a duration Toff of the off-period. The duration Ton of the on-period will be referred to as on-time in the following, and the duration Toff of the off-period will be referred to as off-time in the following.

Referring to FIG. 6, the input current Iin increases during the on-time Ton and decreases during the off-time Toff. During the on-time, the electronic switch 31, referring to FIG. 1, connects the primary winding 21 of the transformer to the input 11, 12 where the input voltage Vin is available. The slope of the increase of the input current Iin during the on-time Ton is substantially proportional to the voltage level of the input voltage Vin and substantially inversely proportional to the inductance of the primary winding 21 and the transformer, respectively. During the on-time Ton, a voltage V21 across the primary winding substantially corresponds to the input voltage Vin and a voltage V22 across the secondary winding 22 substantially corresponds to -N22/N21 Vin, where N21 represents the number of windings of the primary winding 21 and N22 represents the number of windings of the secondary winding 22. As the voltage V22 across the secondary winding 22 is negative during the on-period (which is by virtue of the primary winding 21 and the secondary winding 22 having opposite winding senses) a current I22 through the primary winding 22 is zero during the on-period.

At the beginning of the off-time Toff, the voltage V21 across the primary winding 21 and, consequently, the voltage V22 across the secondary winding 22 reverses the polarity and increases until the voltage V22 across the secondary winding 22 substantially corresponds to the output voltage Vout plus a voltage V41 across the rectifier circuit 41. In the rectifier circuit 41 shown in FIG. 4, the voltage V41 substantially corresponds to the forward voltage of the rectifier element 411. During the off-time, the primary winding 21 is being demagnetized and transfers the energy that was inductively stored in the primary winding 21 during the on-time to the secondary winding 22 and the output 13, 14, respectively.

The output voltage Vout of the switched-mode power converter can be controlled by controlling the average input power of the switched-mode power supply in the individual drive cycles. The average input power $P_{AVG}$ in one drive cycle is given by:

$$P_{AVG} = \frac{Vin}{Tp} \cdot \int_{Tp} Iin \, dt \qquad (1)$$

where $P_{AVG}$ is the average input power in one drive cycle, Tp is the duration of the drive cycle, Vin is the input voltage, and Iin is the input current. Equation (1) is based on the assumption that the input voltage Vin changes slowly relative the duration Tp so that the input voltage can be considered constant during one drive cycle.

In the embodiment shown in FIG. 6, a new drive cycle starts shortly after the secondary side current I22 has decreased to zero. In this embodiment, the average input power $P_{AVG}$ in one drive cycle can be varied by either varying the on-time, or by varying the off-time.

According to one embodiment, the controller 10 controls the on-time Ton based on the feedback signal FB. In this embodiment, the controller 10 internally generates a threshold level Ith based on the feedback signal FB and switches off the electronic switch 31, when the input current Iin represented by the current sensing signal CS reaches the current threshold Ith.

Different criteria may be used to set the beginning of the on-period. According to one embodiment, the controller 10 operates the switched-mode power converter in a discontinuous current mode (DCM). In this case, the electronic switch 31 is periodically switched on, wherein the switching frequency is selected such that the secondary side current I22 decreases to zero in each drive cycle. According to another embodiment, the controller 10 operates the switched-mode power converter in a quasi-resonant (QR) mode in which the beginning of a new drive cycle is selected based on a time instance at which the secondary side current I22 has decreased to zero, or the transformer has been demagnetized, respectively. This is explained in further detail herein below.

According to one embodiment, the switched-mode power converter is configured to supply the output voltage Vout from an input voltage Vin with a varying voltage level. The input voltage Vin may, for example, vary between 70V and 380V. As the voltage level of the input voltage Vin may affect the operation of the switched-mode power converter, it may be desirable to measure the voltage level of the input voltage Vin. Referring to the explanation above, the voltage level of the input voltage Vin is measured based on a voltage level of the auxiliary voltage Vaux.

FIG. 6 illustrates an ideal timing diagram of the auxiliary voltage Vaux. By virtue of the inductive coupling between the auxiliary winding 23 and the primary winding 21, the voltage level of the auxiliary voltage Vaux during the on-time Ton corresponds to $$Vaux = -N23/N21 \cdot Vin \qquad (2a)$$

where N23 represents the number of windings of the auxiliary winding 23. During the off-time, the voltage level of the auxiliary voltage Vaux substantially corresponds to $$Vaux = N23/N22 \cdot (Vout + V41) \qquad (2b)$$

as long as the current I22 through the secondary winding 22 has not decreased to zero. As the secondary side current I22 decreases to zero, that is, as the transformer is completely demagnetized, the secondary side voltage V22 and, consequently, the auxiliary voltage Vaux becomes zero.

As mentioned above, the timing diagram shown in FIG. 6 represents a theoretic (ideal) case. In a real circuit, parasitic devices, such as parasitic capacitances of the transformer may cause oscillations of the auxiliary voltage Vaux, in particular after the transformer has been demagnetized. This is explained in further detail with reference to FIG. 10 herein below. Further, oscillations of the auxiliary voltage Vaux may occur at the beginning of the on-period, so that in a certain time period after the beginning of the on-period, the auxiliary voltage Vaux is not representative of the input voltage Vin. Further, parasitic effects in the measurement circuit 6 may require the auxiliary voltage Vaux to be substantially stable (steady) in order to reliably measure the voltage level of the auxiliary voltage Vaux. Considering this, reliably measuring the input voltage Vin based on the auxiliary voltage Vaux during the on-period may require the on-time Ton to be longer than a predefined duration threshold. This duration threshold takes into account the duration of oscillation effects at the beginning of the on-period and the characteristic of the measurement circuit 6. According to one embodiment, the required minimum on-time $Ton_{MIN}$ is in particular between 0.9 microseconds (μs) and 1.1 microseconds (μs). However, there may be operation scenarios in which the on-time in the individual drive cycles is shorter than the minimum on-time $Ton_{MIN}$. This is explained below.

In order to operate the electronic switch 31 with a switching frequency, that is above the acoustic range and in order to be able to implement the switched-mode power converter with relatively small inductors, switching frequencies of 20 kHz to 100 kHz, e.g., 60 kHz may be desirable. When the power consumption of the load Z is relatively low, the lower boundary of the switching frequency range is selected due to efficiency considerations. According to one embodiment the duration of the on-period Ton may become less than 1 microsecond, or even less than 0.5 microseconds. This, however, is in contradiction to adjusting the duration of the on-period Ton to be higher than a predefined duration threshold ($Ton_{MIN}$) in order to reliably measure the input voltage Vin.

Figure 7:
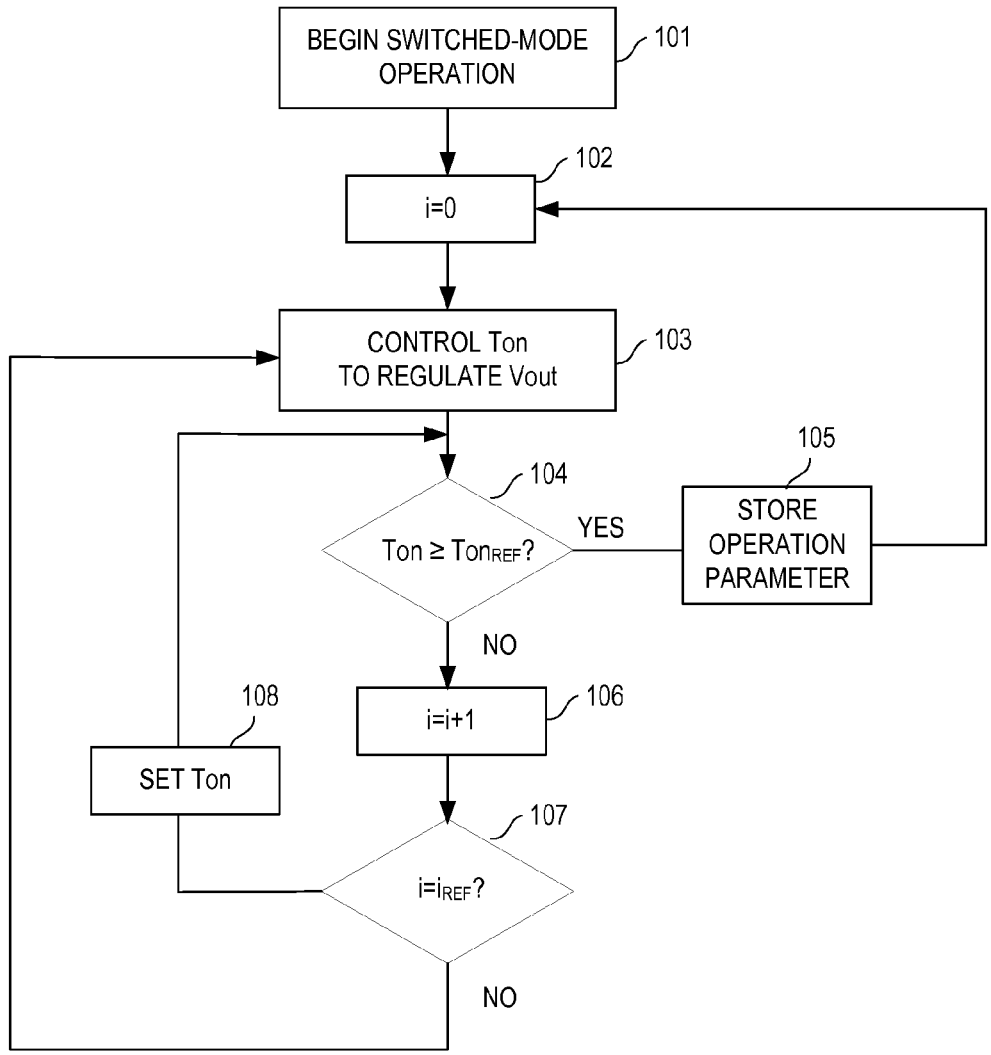
FIG. 7 illustrates one embodiment of a method for operating the switched-mode power converter.

One embodiment of a method performed by the controller 10 that allows the switched-mode power converter to reliably measure an operation parameter, such as the input voltage Vin, independent of a power consumption of the load Z is explained with reference to FIG. 7 below. FIG. 7 is a flowchart that illustrates the operation of the controller 10, and, more specifically, the operation of the control unit 5 in the controller 10.

At the beginning of the switched-mode operation (at 101 in FIG. 7), a counting operation starts. This is represented by setting a counter parameter to zero (i=0) (at 102 in FIG. 2). "Beginning with the switched-mode operation" means that the controller 10 starts to drive the electronic switch 31 in successive drive cycles, wherein in each drive cycle the electronic switch 31 is switched on for an on-period and is switched off for a subsequent off-period. After the beginning of the switched-mode operation, the controller 10 controls the duration of the on-period Ton in order to regulate the output voltage Vout. According to one embodiment, this includes controlling the on-time Ton based on the feedback signal FB. At or after the end of the on-time Ton, the controller 10 compares the duration Ton of the on-period with a duration threshold $Ton_{REF}$ (at 104 in FIG. 7). The duration threshold represents the minimum on-time $Ton_{MIN}$ that is requires to reliably measure the operation parameter. If the on-time Ton is longer than the duration threshold $Ton_{REF}$, the operation parameter measured during the on-time is stored (at 105 in FIG. 7) and the controller 10 restarts the counting operation. According to one embodiment, the operation parameter measured in the on-time is the input voltage Vin. In this case, a representation of the input voltage Vin such as the measurement signal $SV_{in}$ shown in FIG. 1 is stored.

If the on-time Ton period is shorter than the duration threshold $Ton_{REF}$, the measured operation parameter (if any was measured) is not stored and the counting variable is increased (at 106 in FIG. 7). At this time, the counting variable i represents the number of successive on-periods with on-times shorter than the duration threshold that have occurred. The counting variable is then compared with a threshold $i_{REF}$ (at 107 in FIG. 7). If the counting variable does not match the threshold $i_{REF}$, the method proceeds to the next drive cycle in which the on-time is again controller in order to regulate the output voltage Vout. If, however, the counting variable has reached the threshold $i_{REF}$, the controller 10, in the next drive cycle, forces the on-time to be at least as long as the duration threshold $Ton_{REF}$. According to one embodiment, the duration threshold $Ton_{REF}$ is selected such that the external parameter can be reliably measured in this time period. In the following, an on-time shorter than the threshold $Ton_{REF}$ will be referred to as short on-time.

In the method explained with reference to FIG. 7, the on-period in one drive cycle is forced to have an on-time Ton that corresponds to the duration threshold $Ton_{REF}$, or is longer, if a predefined number of drive cycles have passed in which the duration of the on-period was shorter than the duration threshold $Ton_{REF}$. In the method illustrated in FIG. 7, the predefined number corresponds to the counter threshold $i_{REF}$. Just for the purpose of explanation it is assumed that the counting variable I is incremented after each drive cycle with an on-time Ton shorter than the duration threshold. It should be noted that other counting methods may be used as well. According to one embodiment (not shown), the counting variable is set to a start value other than zero at the beginning, and the counting variable is decremented after each drive cycle with an on-time Ton shorter than the duration threshold. In this embodiment, the counter threshold $i_{REF}$ smaller than the start value, and the difference between the start and the counter threshold $i_{REF}$ represents the number of successive drive cycles with short on-period that may pass before the controller 10 forces the on-period Ton in one drive cycle to be at least the duration threshold $Ton_{REF}$.

According to another embodiment, the controller 10 does not count the number of drive cycles with short on-times, but measures the time that has lapsed since the operation parameter has been stored for the last time. In this embodiment, a timer is set to a start time in step 102, step 106 can be omitted, and in step 107 the controller 10 checks whether the timer has reached an end-time. The timer is reset each time an operation parameter is stored. In this embodiment, the controller 10 forces the on-time Ton in a drive cycle to at least correspond to the duration threshold $Ton_{REF}$, if a new (updates) operation parameter has not been stored for longer than a predefined time period, wherein this time period is given by the time difference between the start-time and the end-time of the timer. In one specific embodiment the on-time Ton can be set to at least correspond to the duration threshold $Ton_{REF}$ by appropriately adjusting the peak current. For example, setting a current threshold Ith, which defines the peak current (see FIG. 15), to a reference peak current value $Ith_{REF}$ results in an on-time $T_{ON}$ equal or greater than the mentioned reference duration $Ton_{REF}$.

In the following, the operation of the controller to force the on-time Ton of one drive cycle to be equal to or longer than the threshold $Ton_{REF}$, will be referred to as inserting a measurement pulse, as this pulse of drive signal mainly serves to measure the operation parameter.

According to one embodiment, the predefined number of drive cycles with short on-times that may pass before the controller 10 inserts a measurement pulse, or the predefined time period that may pass, is fixed. In the embodiment shown in FIG. 7, parameter $i_{REF}$ represents this number. According to one embodiment, this number or time period is programmed into the control unit 5.

According to another embodiment (illustrated in FIG. 8) the predefined number or the predefined time period may vary. In the embodiment shown in FIG. 8, the predefined number or the predefined time period is changed after the controller 10 has enforced the long on-period. In this embodiment, the controller 10 may include a look-up table in which different numbers or time periods are stored, and the controller 10 may be configured to select one of these numbers or time periods from the look-up table. For example, time periods are selected from a range between 1 ms and 10 ms, particularly 5 ms and 10 ms.

Figure 8:
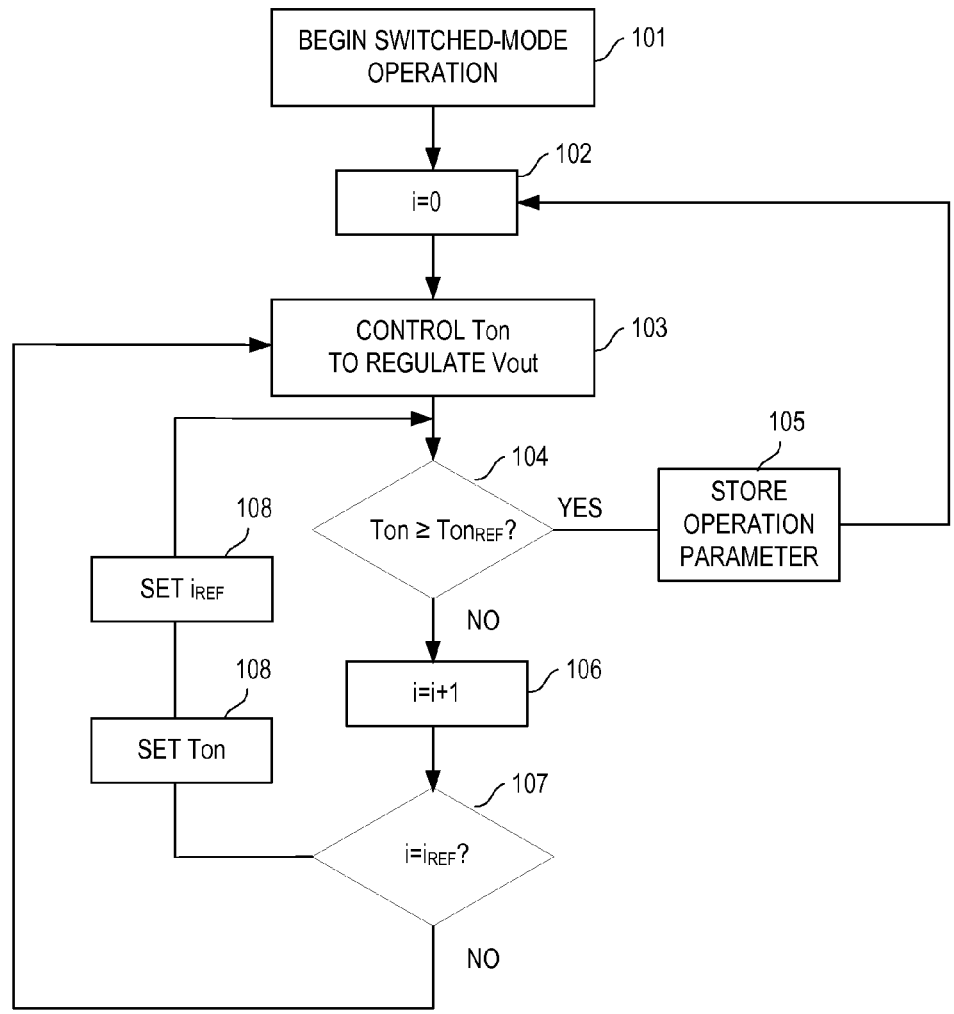
FIG. 8 illustrates a modification of the method illustrated in FIG. 7.

In the method explained with reference to FIGS. 7 and 8, the on-time Ton of the on-period is compared with the duration threshold $Ton_{REF}$ after each drive cycle. However, this is only an example. According to another embodiment, the controller 10 compares the duration Ton of the on-period with the duration threshold only every 2nd, $3^{rd}$, $4^{th}$, or the like, drive cycle.

An operation of the controller 10 in which the controller 10 controls the on-time in a drive cycle in order to regulate the output voltage Vout can be referred to as a first operation mode. An operation mode, in which the controller 10 forces the on-time to be equal to or longer than the duration threshold (that is, inserts a measurement pulse) can be referred to as second operation mode. Thus, the controller 10 operates in the first operation mode, unless the operation parameter has not been updated for a predefined number of drive cycles or for a predefined time period. As the operation parameter, such as the input voltage Vin, may vary, updating the operation parameter may be necessary in order to be able to properly regulate the output voltage Vout. In those drive cycles, in which the controller 10 inserts a measurement pulse, the average input power (the energy) received in the respective drive cycle may be higher than required to control the output voltage Vout. However, as those measurement pulses power are introduced sporadically, they do not significantly influence (disturb) the regulation of the output voltage Vout.

According to one embodiment, only one measurement pulse is introduced if the operation parameter has not been updated for the predefined number of drive cycles or for the predefined time period. According to another embodiment, instead of only one measurement pulse, two or three measurement pulses are inserted.

Figure 9:
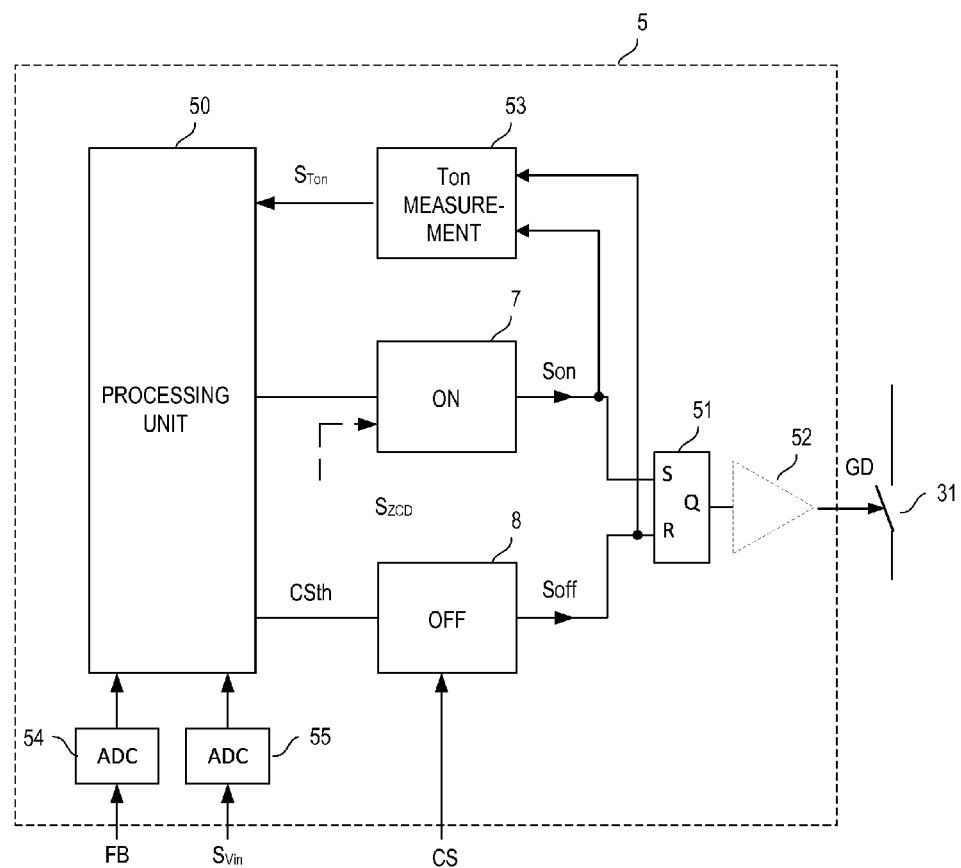
FIG. 9 shows one embodiment of a control unit of a controller (drive circuit) of the switched-mode power converter.

FIG. 9 shows one embodiment of a control unit 5 that generates the drive signal GD based on the feedback signal FB and the operation parameter $S_{ym}$ received from the measurement circuit 6. The control unit 5 shown in FIG. 9 includes a digital processing unit 50, such as a microcontroller. The processing unit 50 receives a digital representation of the feedback signal FB from an analog-to-digital converter (ADC) 54 that receives the feedback signal FB. The processing unit 50 further receives a digital representation of the operation parameter $S_{Vin}$ from an ADC 55 which receives the operation parameter $S_{Vin}$. The control unit 5 further includes a flip-flop 51 that generates the drive signal GD based on an on-signal $S_{ON}$ and an off-signal $S_{OFF}$. The output signal of the flip-flop 51 is a logic signal that assumes one of an on-level and an off-level. The on-level switches on the electronic switch 31, and the off-level switches off the electronic switch 31. Optionally, a driver 52 is connected between the output of the flip-flop 51 and the electronic switch. The driver 52 is configured to adapt a signal level of the flip-flop 51 output signal to a signal level that is suitable to drive the electronic switch 31. In the embodiment shown in FIG. 9, the flip-flop 51 is implemented as an SR flip-flop. However, this is only an example. Any other type of flip-flop or device that can assume two different states may be used as well.

Referring to FIG. 9, the control unit 5 further includes an on-circuit 7 that is configured to switch on the electronic switch 31 through the flip-flop 51, and an off-circuit 8 that is configured to switch off the electronic switch 31 through the flip-flop 51. In the embodiment shown in FIG. 9, the on-circuit generates an on-signal, and the off-circuit generates an off-signal. The on-circuit 7 is configured to set the flip-flop 51 (in order to switch on the electronic switch 31) by generating a predefined signal level or a predefined edge of the on-signal Son. Equivalently, the off-circuit 8 is configured to reset the flip-flop 51 (in order to switch off the electronic switch 31) by generating a predefined signal level or a predefined edge of the off-signal Soff.

Referring to FIG. 9, the control unit 5 further includes a time measurement circuit 53 that is configured to measure the on-times Ton of the individual drive cycles. In the embodiment shown in FIG. 9, the time measurement circuit 53 receives the on-signal $S_{ON}$ and the off-signal $S_{OFF}$. Based on these signals $S_{ON}$, $S_{OFF}$ the time measurement circuit 53 is configured to calculate a time difference between the time when the on-circuit 7 switches on the electronic switch 31 and the time when the off-circuit 8 switches off the electronic switch 31. A measurement signal $S_{Ton}$ provided by the time measurement circuit 53 to the processing unit 50 represents the on-time Ton of the on-period of one drive cycle.

The on-circuit 7 and the off-circuit 8 are controlled by the processing unit 50. According to one embodiment, the processing unit 50 controls the on-circuit 7 such that the on-circuit switches on the electronic switch 31 at a switching frequency defined by the processing unit 50. In this case, the controller 10 operates the switched-mode power supply in a DCM.

The off-circuit 8 receives the current sensing signal CS that represents the input current Iin from the current sensor and a current threshold signal CSth from the processing unit 50. The current threshold signal CSth represents the current threshold Ith at which it is desired to switch off the electronic switch 31. According to one embodiment, the off-circuit 8 switches off the electronic switch 31 based on the current sensing signal CS and the current threshold signal CSth, for example, each time the sensing signal CS indicates that the input current Iin has reached the threshold signal $I_{TH}$.

Figure 10:
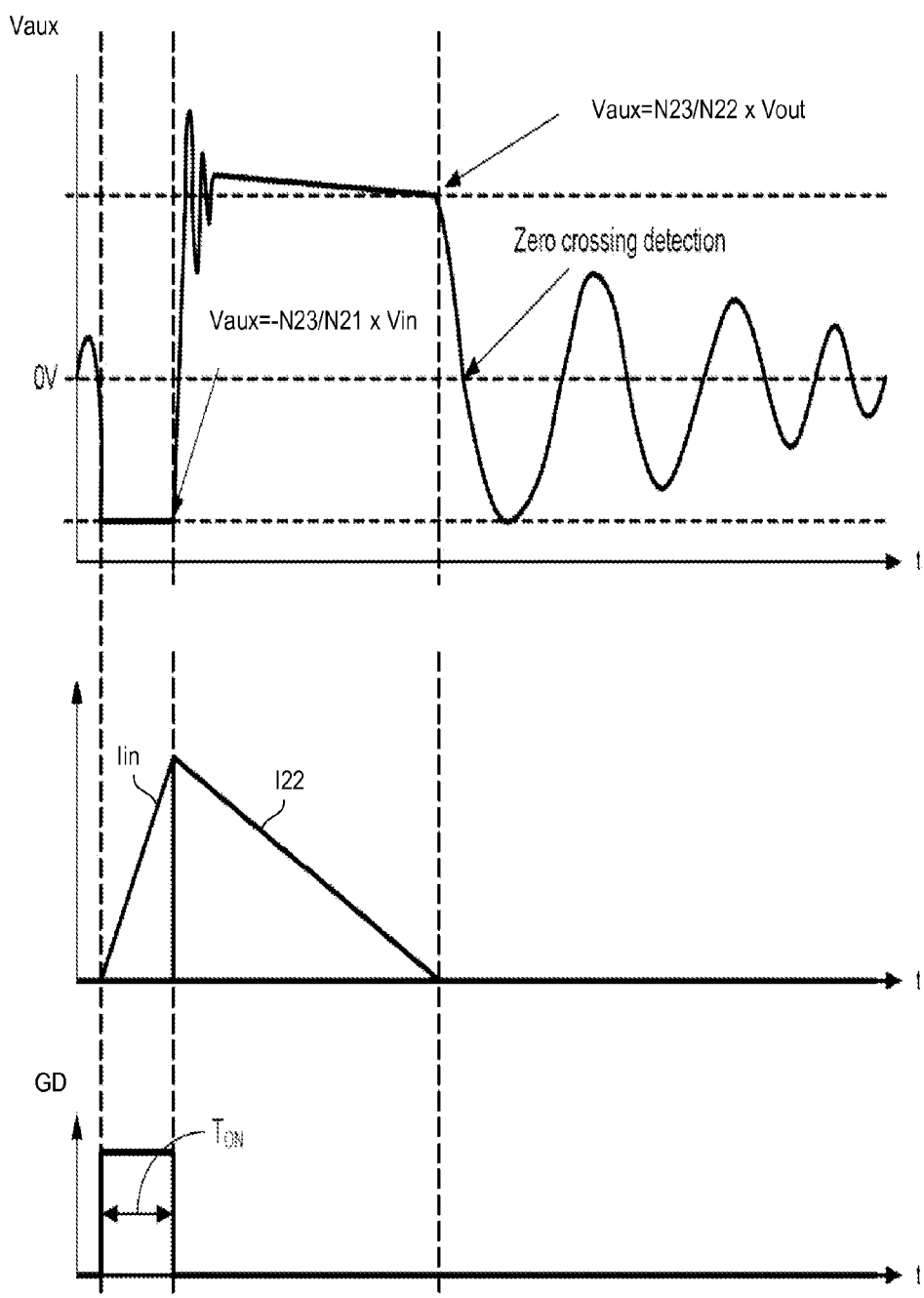
FIG. 10 shows timing diagrams that illustrate one way of setting the beginning of on-periods in driving the electronic switch.

Referring to the explanation herein before, oscillations of the auxiliary voltage Vaux may occur after the transformer has been demagnetized and before the electronic switch 31 is again switched on. FIG. 10 shows timing diagrams of the input current Iin, the secondary side current I22 and the auxiliary voltage Vaux in one drive cycle in which oscillations of the auxiliary voltage Vaux occur. Referring to FIG. 10, the oscillating auxiliary voltage Vaux periodically crosses zero and periodically has local minima (valleys). Oscillations of the auxiliary voltage Vaux occur, because parasitic oscillations of the primary voltage V21 occur after the transformer has been demagnetized. Those parasitic oscillations are caused by parasitic capacitances (not shown) of the transformer (one of these parasitic capacitances can be considered to be connected in parallel with the primary winding 21, and the other one of the parasitic capacitances can be considered to be connected in parallel with the electronic switch 31). It can be shown that each time the auxiliary voltage Vaux has a valley, the voltage across the electronic switch 31 has a minimum value caused by the parasitic oscillations. In order to reduce switching losses it may be desirable to switch on the electronic switch 31 when the auxiliary voltage Vaux substantially is in a valley.

Figure 11:
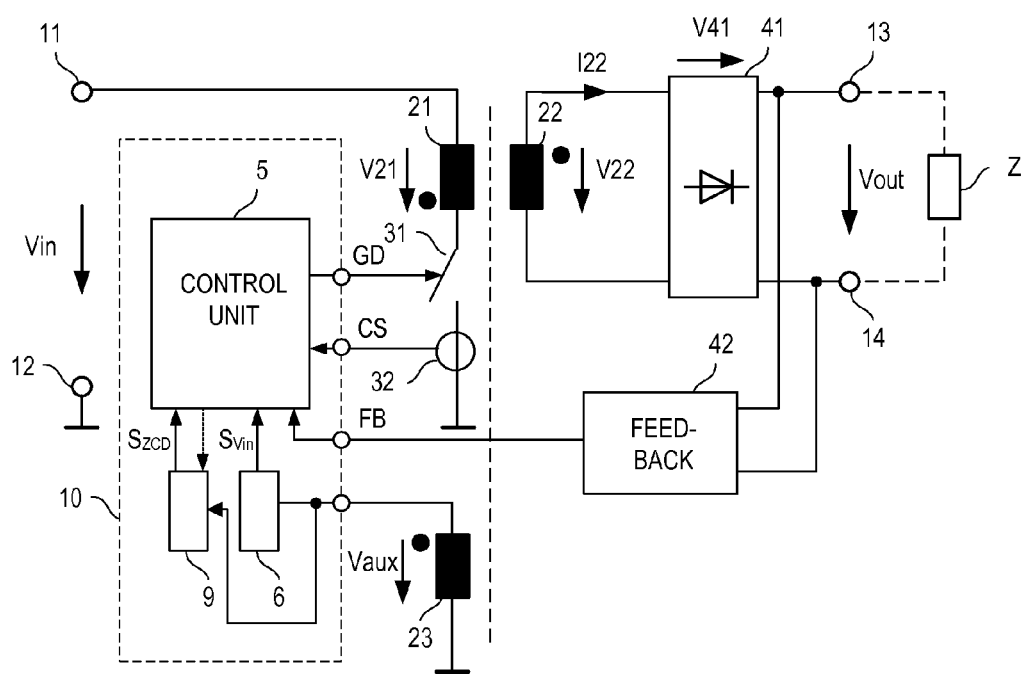
FIG. 11 shows one embodiment of a switched-mode power converter in which the drive circuit includes a zero crossing detector.

According to one embodiment shown in FIG. 11, the switched-mode power converter includes a zero crossing detector 9 which receives the auxiliary voltage Vaux and which is configured to detect valleys of the auxiliary voltage Vaux based on zero crossings of the auxiliary voltage Vaux. The oscillation frequency (or oscillation period) may be calculated or measured at the end of the manufacturing process, and the information on this frequency may be stored in the controller. Based on the zero crossing and the frequency information, the controller 10, in particular the zero crossing detector 9, may detect a valley, which occurs a defined time (e.g., a quarter of the oscillation period for the first valley) after the zero-crossing on the falling edge of $V_{AUX}$. The zero crossing detector is configured to output a signal $S_{ZCD}$ that represents time of the minimum of the oscillation on $V_{AUX}$. The time instant at which a predefined valley of the auxiliary voltage Vaux occurs is indicated by delaying the detected zero crossing of the falling edge of $V_{AUX}$ by an appropriate delay time (e.g., a quarter of the oscillation period as mentioned above). Referring to FIG. 10, the auxiliary voltage Vaux may have several valleys before the electronic switch 31 is again switched on. According to one embodiment, the control unit 5 is configured to generate the signal $S_{ZCD}$ such that the signal $S_{ZCD}$ carries information on the time at which a valley with a predefined order number occurs. In each drive cycle the order number indicates the order of a valley in the series of valleys that may occur after the first zero crossing of the auxiliary voltages Vaux. For example, the first valley after the first zero crossing may have order number 1. According to one embodiment, the signal $S_{ZCD}$ includes a signal pulse each time the valley with the predefined order number is detected.

The predefined order number may change during the operation. That is, there may be operation scenarios in which it is desired to which on at the first valley, while in other operation scenarios it may be desirable to switch on later (that is, at a valley with a higher order number). According to one embodiment, the processing unit 5 provides the information to zero crossing detector 9 which valley in each drive cycle the zero crossing detector 9 is to detect.

According to one embodiment (shown in dashed lines in FIG. 9), the on-circuit 7 receives the output signal $S_{ZCD}$ of the zero crossing detector 9 and switches on the electronic switch 31 each time the signal $S_{ZCD}$ indicates that a predefined valley of the auxiliary voltage Vaux has been detected (i.e., the valley occurs a quarter of the oscillation period after the zero-crossing), so as to operate the switched mode power converter in the QR mode.

Figure 12:
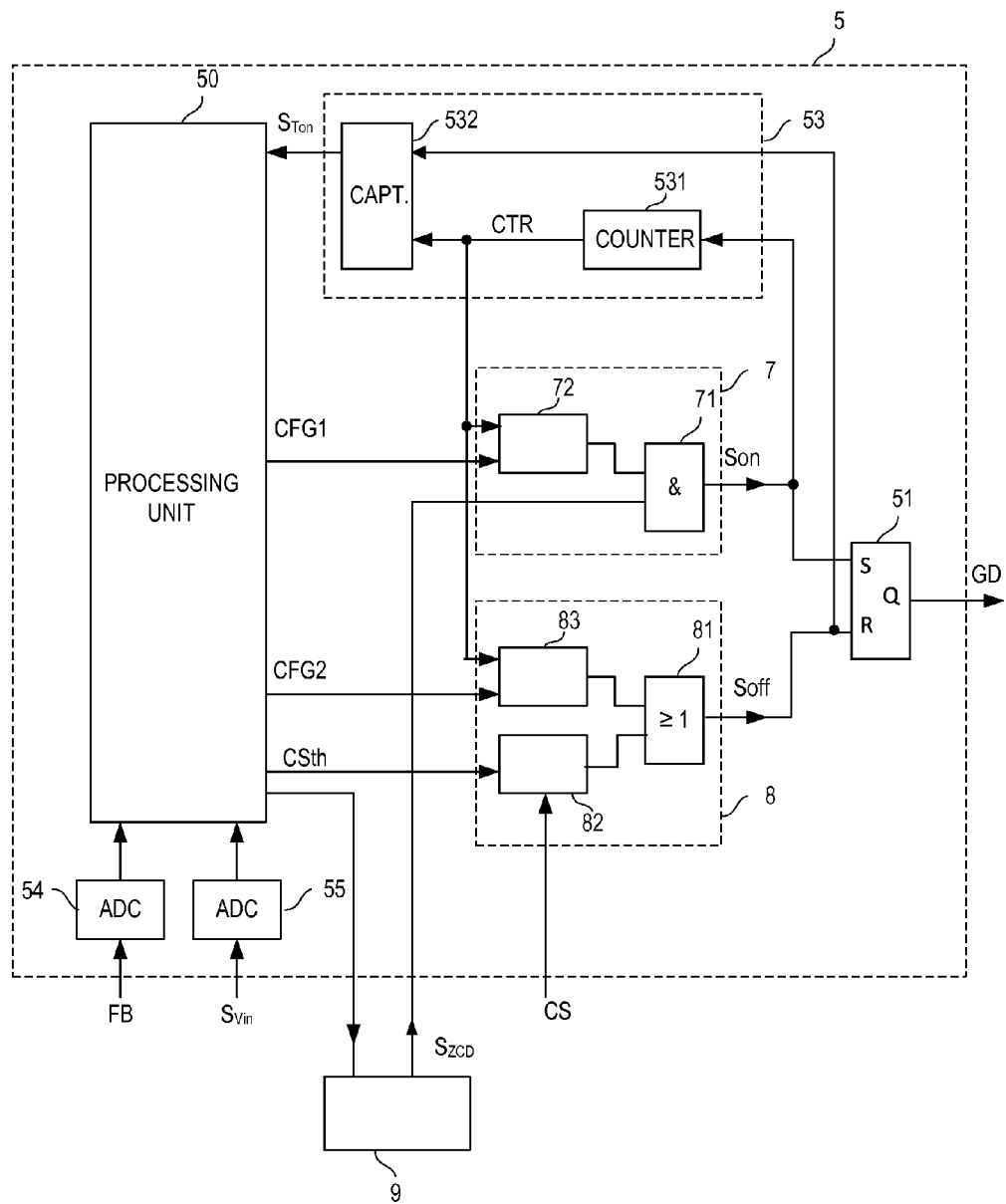
FIG. 12 shows one embodiment of the control unit in greater detail.

FIG. 12 shows one embodiment of the control unit 5 in greater detail. In this embodiment, the on-circuit 7 includes an AND-gate 71 that receives the output signal $S_{ZCD}$ from the zero crossing detector 9 and an output signal from a first comparator 72. The first comparator 72 receives a first configuration signal CFG1 from the processing unit 50 and a counter signal S531 from a counter 531 in the time measurement circuit 53. This counter 531 is reset by the on-signal $S_{ON}$ each time the electronic switch 31 is switched on, that is, at the beginning of each on-period. Thus, switching on the electronic switch 31 defines the beginning of a drive cycle, the counter signal S531 represents the time that has lapsed since the beginning of the drive cycle. The first configuration signal CFG1 represents a minimum duration of the drive cycle. That is, the electronic switch 31 cannot be switched on until the minimum duration of the drive cycle has lapsed. In the embodiment shown in FIG. 12, this is obtained by AND-connecting an output signal of the first comparator 72 with the output signal $S_{ZCD}$ of the zero crossing detector 9 in order to generate the on-signal $S_{ON}$. The output signal of the first comparator 72 assumes a signal level that enables the output signal of the zero crossing detector 9 to switch on the electronic switch 31 only after the time period defined by the first configuration signal CFG1 has lapsed.

The time measurement circuit 53 further includes a capture unit 532 that receives the counter signal S531 and the off-signal $S_{OFF}$. The capture unit 532 captures the counter signal (the counter reading) S531 at the time at which the off-signal $S_{OFF}$ switches off the electronic switch 31 and passes the captured counter reading as the signal $S_{Ton}$ representing the duration of the on-period to the processing unit 50. Based on this signal $S_{Ton}$, the processing unit 50 determines whether the on-time Ton was shorter than the duration threshold $Ton_{REF}$.

Referring to FIG. 12, the off-circuit 8 includes a first comparator 82 that receives a digital representation of the current sensing signal. The first comparator further receives the current threshold signal CSth. The off-circuit 8 further includes a second comparator 83 that receives the counter reading S531 and a second configuration signal CFG2 from the processing unit 50. The second configuration signal CFG2 represents a maximum on-period of the electronic switch 31. An OR-gate 81 receives output signals from the first and second comparators 82, 83. In this embodiment, the off-circuit 8 switches off the electronic switch 31 either when the input current Iin as represented by the current sensing signal CS reaches the current threshold Ith represented by the signal CSth, or when the electronic switch 31 (not shown in FIG. 12) has been switched on for a maximum on-period defined by the second configuration signal CFG2.

In the circuit shown in FIG. 12, the processing unit may insert a measurement pulse by setting the current threshold to a level that is high enough for the on-time Ton to correspond to $Ton_{REF}$ or to be longer.

Figure 13:
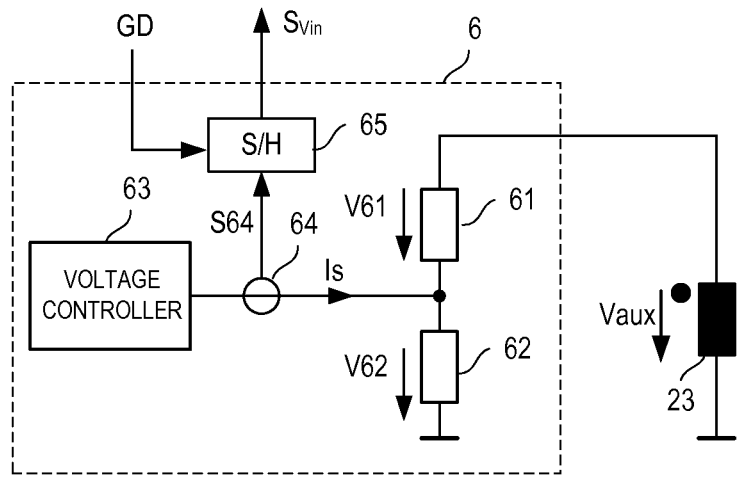
FIG. 13 shows one embodiment of an input voltage measurement circuit.

FIG. 13 shows one embodiment of the measurement circuit 6 that is configured to measure the auxiliary voltage Vaux. In this embodiment, a voltage divider with two resistors 61, 62 is connected in parallel with the auxiliary winding 23. A voltage controller 63 is coupled to a tap of the voltage divider and is configured to control a voltage V62 across the resistor 62 to substantially correspond to a reference voltage $V62_{1F}$. A further current sensor 64 senses a current Is the voltage controller 63 provides to the tap in order to control the voltage V62. According to one embodiment, a resistance R62 of the resistor 62 is significantly smaller than a resistance R61 of the other resistor 61 (R62<<R61). In this case, the current Is can be considered to substantially flow through the resistor 61. Further, the reference voltage $V62_{REF}$ may be set to be significantly smaller than the auxiliary voltage Vaux during the on-time. Thus, a voltage V61 across the resistor 61 substantially corresponds to the auxiliary voltage Vaux, so that based on the known resistance R61 of the resistor 61 the auxiliary voltage Vaux can be calculated from current Is as follows:

$$Vaux = Is \cdot R61. \qquad (3)$$

Thus, the current Is measured by the further current sensor 64 is a representation of the auxiliary voltage Vaux and, therefore, is a representation of the input voltage Vin. According to one embodiment, the reference voltage $V62_{REF}$ is between −100 mV and −300 mV. The resistance 61 of the resistor 61 is, for example, between 5 kΩ and 30 kΩ. According to one embodiment, the resistance R62 of the resistor 62 is less than 20% of R61.

Referring to FIG. 13, a sample-and-hold (S/H) circuit 65 receives a measurement signal from the further current sensor, with this signal representing the current Is. According to one embodiment, the S/H circuit 65 receives the gate drive signal GD and samples and holds the measurement signal S64 each time the gate drive signal switches off the electronic switch, that is at the end of the on-time. Thus, the operation parameter signal $S_{Vin}$ represents the input voltage Vin as represented by the auxiliary voltage Vaux at the end of each on-time. The decision whether the operation parameter represented by the operation parameter signal $S_{Vin}$ is stored is taken by the processing unit based on the measured on-time Ton.

Figure 14:
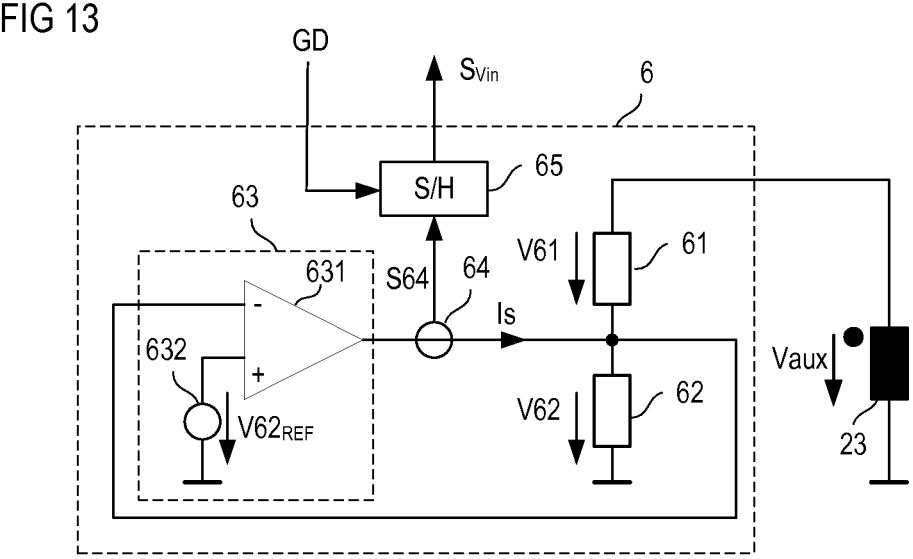
FIG. 14 shows one embodiment of a voltage controller in the input voltage measurement circuit shown in FIG. 13.

FIG. 14 shows one embodiment of the voltage controller 63 shown in FIG. 13. In this embodiment, the voltage controller 63 includes an operational amplifier 631 that receives the reference voltage $V62_{REF}$ from a reference voltage source 632 at a first input. Further, the operational amplifier 631 receives the voltage V62 across the resistor 62 at a second input.

Figure 15:
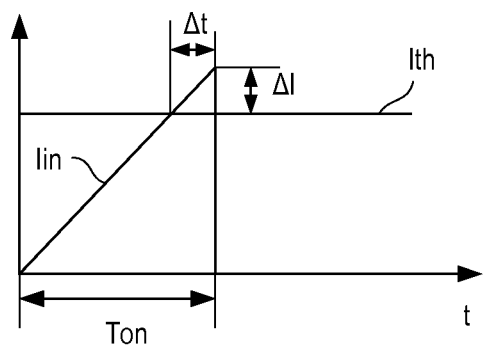
FIG. 15 schematically illustrates the effect of a pulse delay in a switched-mode power converter.

In the explanation above, it is assumed that the electronic switch 31 switches off when the input current Iin reaches the current threshold Ith. However, due to inevitable propagation delays in the controller 10 and in the switch 31, there is a time delay between the time when the input current Iin reaches the current threshold Ith, and the time when the electronic switch 31 switches off. This is illustrated in FIG. 15. In FIG. 15, Δt denotes the time difference between the time when the off-circuit 8 (based on the signal CS) detects that the input current Iin has reached the current threshold Ith and the time when the electronic switch 31 switches off. Referring to FIG. 12, this time delay may be caused by propagation delays in the comparator 82, the OR-gate 81, the flip-flop 51 and the driver 52 and additional by inevitable switching delays of the electronic switch 31.

According to one embodiment, the controller 10 is configured to compensate for this time delay $\Delta t$. That is, the controller 10, in particular the processing unit 50, when calculating the current threshold signal CSth (that represents Ith) based on the feedback signal FB takes into account an increase $\Delta$Iin of the input current Iin during this time difference $\Delta t$. However, the current difference $\Delta$Iin is dependent on the input voltage Vin as the slope of the input current Iin is dependent on the input voltage. That is, at a given time difference $\Delta t$, the current difference $\Delta$Iin increases as the input voltage Vin increases. Thus, the processing unit 50 takes into account the measured input voltage Vin in the delay compensation.

According to another embodiment, the second configuration signal CFG2 which defines the maximum on-period is dependent on the input voltage Vin so as to limit the maximum input power of the switched-mode power supply. According to one embodiment, the maximum on-period decreases as the input voltage Vin increases.

Figure 16:
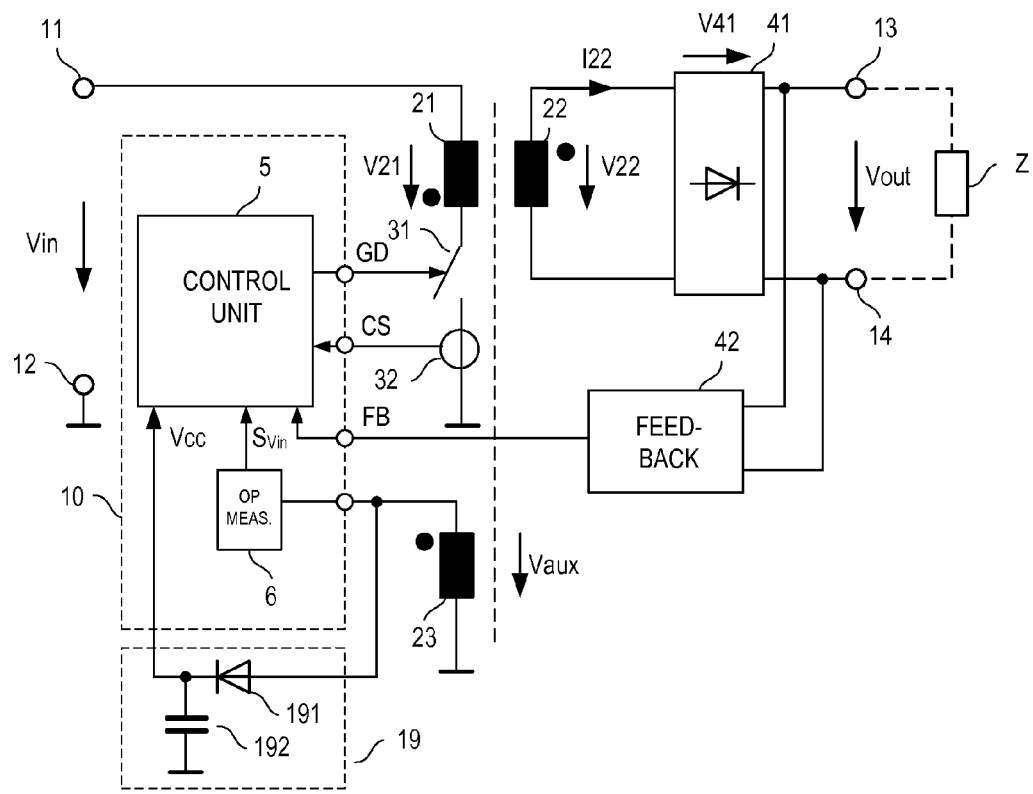
FIG. 16 illustrates one embodiment of generating a supply voltage for the controller.

According to another embodiment, the auxiliary winding 23 is also used to provide a supply voltage Vcc to the controller 10. In this embodiment, which is shown in FIG. 16, a rectifier 19 which, for example, includes a diode 191 and a capacitor 192, receives the auxiliary voltage Vaux. The supply voltage Vcc is available across the capacitor 192 in this embodiment.

Figure 17:
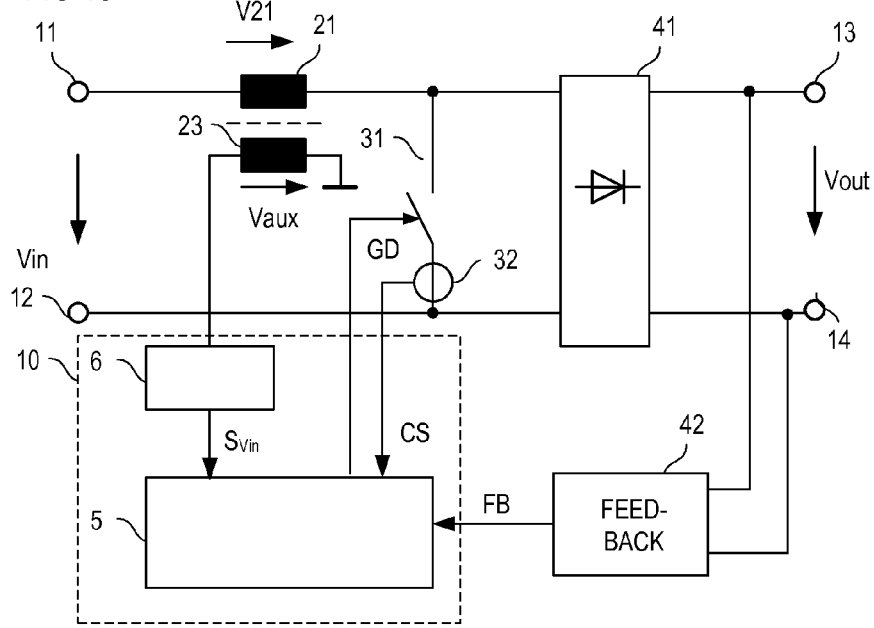
FIG. 17 shows another embodiment of a switched-mode power converter.

It should be noted that the principles explained herein before are not restricted to be used in context with a flyback converter, but may be used in other types of converters as well. FIG. 17 shows one embodiment of a boost converter that includes an inductor 21 connected in series with an electronic switch 31, wherein the series circuit is connected to the input 11, 12. An auxiliary winding 23 is inductively coupled with the inductor 21, and a measurement circuit 6 receives an auxiliary voltage Vaux. The auxiliary winding 23 and the inductor 21 have the same winding senses so that the auxiliary voltage represents the voltage across the inductor 21. When the electronic switch 31 is switched on, the voltage V21 across the inductor substantially corresponds to the input voltage Vin, so that the auxiliary voltage Vaux represents the input voltage Vin during the on-period of the electronic switch 31. Like in the embodiments explained hereinbefore, a controller 10 drives the electronic switch 31 dependent on a feedback signal FB in order to regulate an output voltage Vout. The feedback signal FB is based on the output voltage Vout.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blueray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method comprising:
    driving an electronic switch in a switched-mode power converter in successive drive cycles, wherein driving the electronic switch in each of the successive drive cycles comprises switching on the electronic switch for an on-period and subsequently switching off the electronic switch for an off-period;
    measuring an operation parameter of the switched-mode power converter during the on-periods in the successive drive cycles, and storing the operation parameter measured in the on-period if a duration of the on-period met a predefined criteria; and
    forcing the on-period of at least one of the successive drive cycles to meet the predefined criteria if the operation parameter has not been stored for a predefined number of drive cycles of the successive drive cycles, or for a predefined time duration.

2. The method of claim 1, wherein the on-period meets the predefined criteria if it is longer than a predefined time period.

3. The method of claim 1, wherein the operation parameter is an input voltage of the switched-mode power converter.

4. The method of claim 3,
    wherein the switched-mode power converter comprises a transformer with an auxiliary winding, and
    wherein evaluating the operation parameter comprises evaluating a voltage across the auxiliary winding.

5. The method of claim 4, wherein evaluating the voltage across the auxiliary winding comprises:
    driving a current into a tap of a voltage divider connected in parallel with the auxiliary winding such that a voltage across a first resistor of the voltage divider has a predefined voltage, and
    measuring the current as a representation of the voltage across the auxiliary winding.

6. The method of claim 1, wherein the one of the predefined number of drive cycles and the predefined time duration is fixed.

7. The method of claim 1, wherein the one of the predefined number of drive cycles and the predefined time duration is variable such that it is changed after forcing the on-period of a drive cycle to be longer than a duration threshold.

8. The method of claim 1, further comprising: in at least some of those of the successive drive cycles in which the on-period is not forced to be longer than a duration threshold, adjusting the duration of the on-periods based on an output signal of the switched-mode power converter.

9. The method of claim 8, wherein adjusting the duration of the on-periods based on an output signal of the switched-mode power converter comprises: switching off the electronic switch when a predefined maximum duration of an on-period has been reached.

10. The method of claim 1, wherein the switched-mode power converter comprises one of a flyback converter topology, and a boost converter topology.

11. The method of claim 1,
    wherein the switched-mode power converter comprises a transformer with an auxiliary winding, and
    wherein the method further comprises:
    evaluating a voltage across the auxiliary winding and starting the on-periods based on this evaluation.

12. A drive circuit for a switched-mode power converter, wherein the drive circuit is configured:
    to drive an electronic switch of the switched-mode power converter in successive drive cycles such that in each of the successive drive cycles the electronic switch is switched on for an on-period and subsequently switched off for an off-period,
    to measure an operation parameter of the switched-mode power converter during the on-periods in the successive drive cycles, and store the operation parameter measured in an on-period if a duration of the on-period met a predefined criteria, and
    to force the on-period of at least one of the successive drive cycles to meet the predefined criteria if the operation parameter has not been stored for a predefined number of drive cycles of the successive drive cycles, or for a predefined time duration.

13. The drive circuit of claim 12, wherein the on-period meets the predefined criteria if it is longer than a predefined time period.

14. The drive circuit of claim 12, wherein the operation parameter is an input voltage of the switched-mode power converter.

15. The drive circuit of claim 14, wherein the drive circuit, in order to evaluate the operation parameter, is configured to evaluate a voltage across an auxiliary winding of a transformer.

16. The drive circuit of claim 15, wherein the drive circuit is configured:
    to drive a current into a tap of a voltage divider connected in parallel with the auxiliary winding such that a voltage across a first resistor of the voltage divider has a predefined voltage, and to measure the current as a representation of the voltage across the auxiliary winding.

17. The drive circuit of claim 12, wherein the one of the predefined number of drive cycles and the predefined time duration is fixed.

18. The drive circuit of claim 12, wherein the drive circuit is configured to vary one of the predefined number of drive cycles and the predefined time duration such that it changes after forcing the on-period of a drive cycle to be longer than a duration threshold.

19. The drive circuit of claim 12, further configured in at least some of those of the successive drive cycles in which the on-period is not forced to be longer than a duration threshold, to adjust the duration of the on-periods based on an output power of the switched-mode power converter.

20. The drive circuit of claim 19, further configured to switch off the electronic switch when a predefined maximum duration of an on-period has been reached.

21. The drive circuit of claim 12, further configured to evaluate a voltage across an auxiliary winding of a transformer and to start the on-periods based on this evaluation.

22. A switched-mode power converter, comprising:
   an electronic switch; and
   a drive circuit, wherein the drive circuit is configured
      to drive the electronic switch of the switched-mode power converter in successive drive cycles such that in each of the successive drive cycles the electronic switch is switched on for an on-period and subsequently switched off for an off-period,
      to measure an operation parameter of the switched-mode power converter during the on-periods in the successive drive cycles, and store the operation parameter measured in the on-period if a duration of the on-period met a predefined criteria, and
      to force the on-period of at least one of the successive drive cycles to meet the predefined criteria if the operation parameter has not been stored for a predefined number of drive cycles, or for a predefined time duration.

23. The switched-mode power converter of claim 22, wherein the switched-mode power converter comprises one of a flyback-converter topology, and a boost converter topology.

24. A method comprising:
   driving an electronic switch in a switched-mode power converter in successive drive cycles, wherein driving the electronic switch in each of the successive drive cycles comprises switching on the electronic switch for an on-period and subsequently switching off the electronic switch for an off-period;
   in a first operation mode, adjusting the on-period based on an output signal of the power converter;
   in a second operation mode, forcing the on-period to be higher than a duration threshold level; and
   entering the second operation mode for at least one of the successive drive cycles if the on-period in the first operation mode has not met a predefined criteria for a predefined number of drive cycles of the successive drive cycles, or a predefined time period.

25. The method of claim 24, further comprising: evaluating an operation parameter of the switched-mode power converter in the on-periods.

26. The method of claim 25, wherein the operation parameter is an input voltage of the switched-mode power converter.

* * * * *